(12) United States Patent
Carvalho

(10) Patent No.: US 9,527,579 B2
(45) Date of Patent: Dec. 27, 2016

(54) PIVOTING BLADE COUNTERWEIGHT

(71) Applicant: HAMILTON SUNDSTRAND CORPORATION, Windsor Locks, CT (US)

(72) Inventor: Paul A. Carvalho, Hadley, MA (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 497 days.

(21) Appl. No.: 14/063,326

(22) Filed: Oct. 25, 2013

(65) Prior Publication Data

US 2015/0118052 A1    Apr. 30, 2015

(51) Int. Cl.
   *B64C 27/50*   (2006.01)
   *B64C 11/34*   (2006.01)
   *B64C 11/32*   (2006.01)

(52) U.S. Cl.
   CPC ............ *B64C 11/346* (2013.01); *B64C 11/325* (2013.01)

(58) Field of Classification Search
   CPC ...... F04D 29/366; F04D 29/362; B64C 11/32; B64C 11/40; F05D 2260/77
   USPC ........................................................ 416/139
   See application file for complete search history.

(56) References Cited

U.S. PATENT DOCUMENTS

2012/0231696 A1    9/2012    Xu

FOREIGN PATENT DOCUMENTS

| EP | 2774842 A1 | 9/2014 |
| FR | 805813 A | 12/1936 |
| FR | 1032358 A | 7/1953 |
| GB | 2218747 A | 11/1989 |

OTHER PUBLICATIONS

Extended European Search Report; European Application No. 14189957.5-1754; Date of Mailing: Mar. 19, 2015; 7 pages.

*Primary Examiner* — Eric Keasel
*Assistant Examiner* — Jason Mikus
(74) *Attorney, Agent, or Firm* — Cantor Colburn LLP

(57) ABSTRACT

A propeller system includes at least one propeller hub having a plurality of hub arms formed therein. The plurality of hub arms are arranged circumferentially on the at least one propeller hub and are spaced apart from one another by a hub distance. The propeller system further includes a plurality of propeller blades. Each propeller blade includes a base portion rotatably disposed in a respective hub. At least one counterweight is coupled to the base portion of a respective propeller blade. The counterweight includes a hinge configured to pivot a portion of the at least one counterweight.

11 Claims, 5 Drawing Sheets

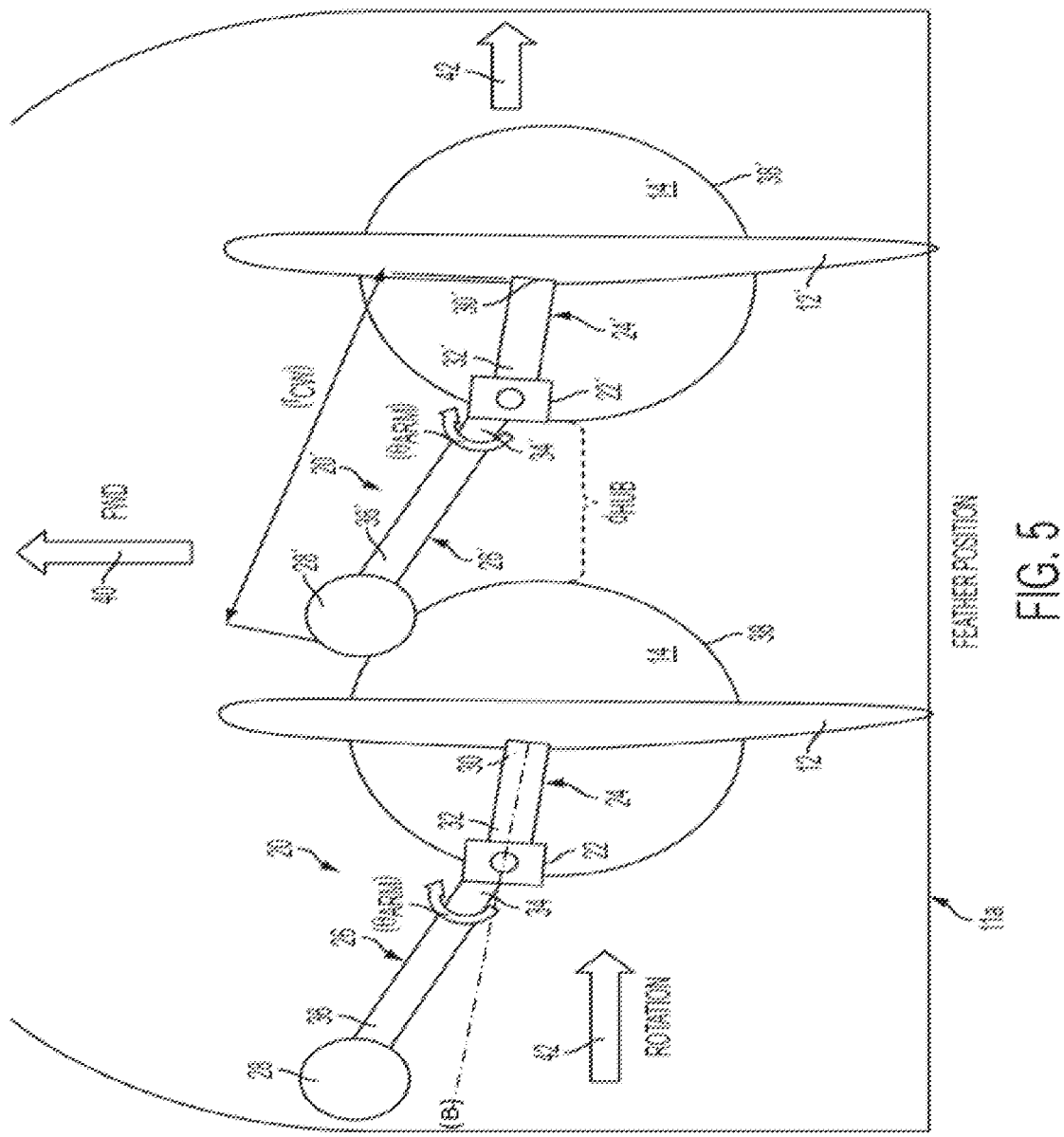

PIVOTING BLADE COUNTERWEIGHT

BACKGROUND OF THE INVENTION

Variable pitch propeller systems incorporate various safety devices to ensure safe operation in case of a hydraulic failure. One type of safety device is a propeller blade counterweight. The propeller blades are arranged on the propeller hub, and the counterweight is attached to the base of the blade and produces a twisting moment on the blade when the propeller is rotating such that the net twisting moment on the blade, including the total blade mass and aerodynamic twisting forces, is in the increase-pitch direction. The net twisting moment can reduce over-speed and high drag conditions if the hydraulic operation of pitch change system fails.

Conventional counterweights are typically optimized to reduce weight by placing the counterweight at the largest radius from the blade rotational axis allowed by the hub envelope supporting the blade. Since the blade counterweight is rigidly attached to the blade, the counterweight must rotate from full reverse to the feather position. In order for the blade to transition to the feather position, the counterweight must pass by an adjacent blade. As the number of blades formed on the propeller hub increases, the distance between adjacent hub arms decreases such that the counterweight contacts an adjacent blade when transitioning to a feather position. Consequently, the overall length of the conventional counterweight must be reduced as the number of propeller blades increase, thereby causing the propeller weight to increase.

SUMMARY

According to at least one embodiment, a propeller system comprises at least one propeller hub having a plurality of hub arms formed therein. The plurality of hub arms are arranged circumferentially on at least one propeller hub and are spaced apart from one another by a hub arm distance. The propeller system further includes a plurality of propeller blades. Each propeller blade includes a base portion rotatably disposed in a respective hub arm. At least one counterweight is coupled to the base portion of a respective propeller blade. The counterweight includes a hinge configured to pivot a portion of the counterweight.

According to another embodiment, a propeller blade assembly comprises a propeller blade configured to operate at a plurality of pitch angles. A counterweight is coupled to the propeller blade. The counterweight includes a hinge configured to pivot a portion of the counterweight based on a pitch angle of the propeller blade.

According to yet another embodiment, a counterweight comprises a fixed arm and a pivoting arm. The fixed arm includes a first end and a second end opposite the first end. The first end is coupled to a base portion of a propeller blade. The pivoting arm includes a proximal end and a distal end opposite the proximate end. A hinge is interposed between the second end of the fixed arm and the proximate end of the pivoting arm. The hinge is configured to pivot the pivoting arm with respect to the fixed arm. A weighted element is coupled to the distal end of the pivoting arm such that the counterweight outputs a torque to the propeller blade.

BRIEF DESCRIPTION OF THE DRAWINGS

The subject matter which is regarded as the invention is particularly pointed out and distinctly claimed in the claims at the conclusion of the specification. The foregoing and other features of the invention are apparent from the following detailed description taken in conjunction with the accompanying drawings in which:

FIG. 5 is a top view of a propeller including a counterweight operating in a feather position according to an embodiment.

DETAILED DESCRIPTION

Figure 1:
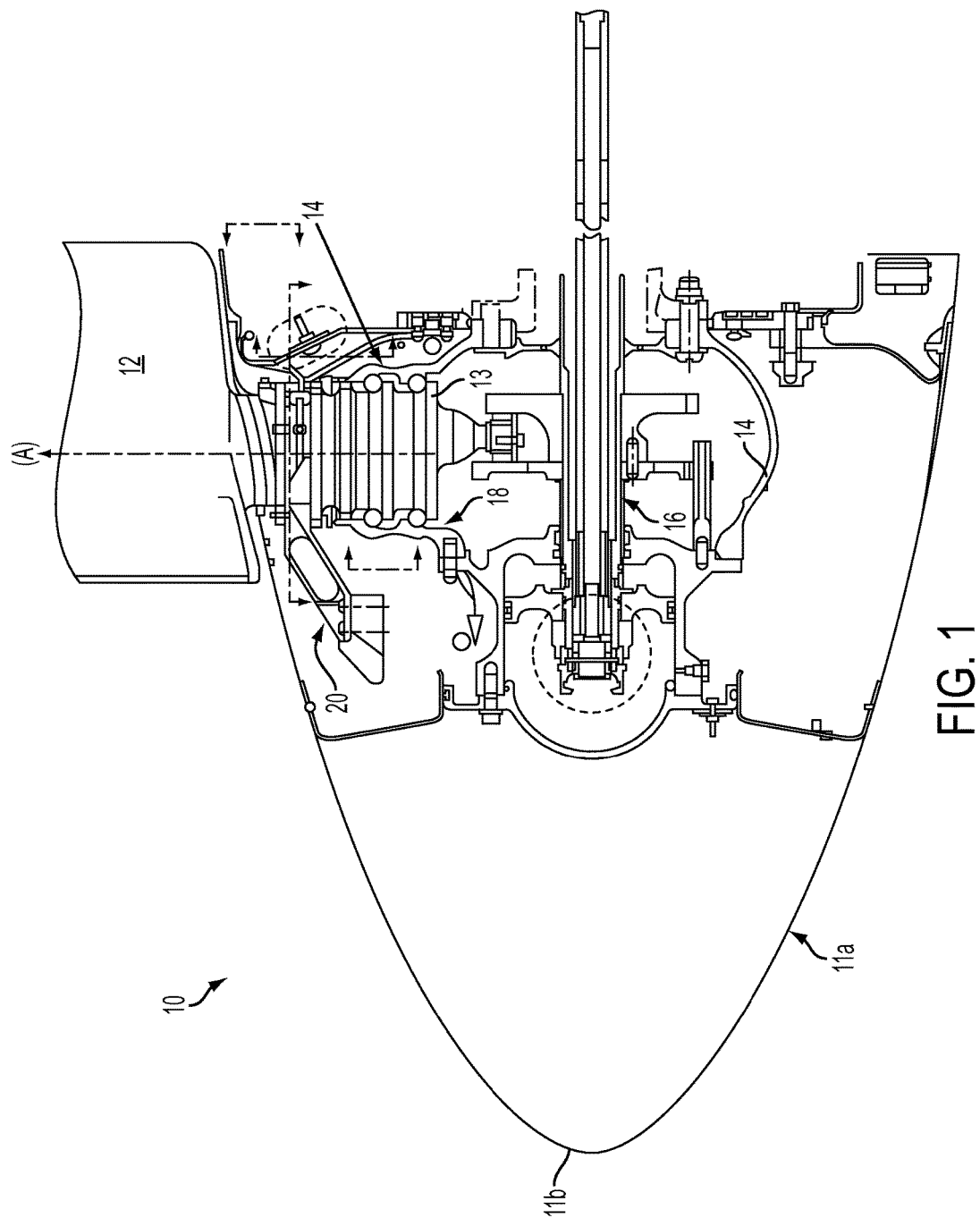
FIG. 1 is schematic illustrating a side-view of a propeller system according to an embodiment.

Turning to FIG. 1, a propeller system 10 is illustrated according to an embodiment of the disclosure. The propeller system 10 includes one or more propeller hub arms 14, pitch-adjustable propeller blades 12, a propeller hub arms 14, a pitch actuator 16, and a bearing arrangement 18. The blades 12 are coupled to the propeller hub 11a and extend radially therefrom. According to at least one embodiment, the blades 12 include a base portion 13 that is moveably supported by the propeller hub arms 14. The blades 12 may have various designs including, but not limited to, an airfoil design as required by a particular aircraft application of the propeller system. The pitch of each blade 12 is adjustable with respect to the propeller hub arms 14 via the bearing arrangement 18. The pitch actuator 16 may comprise a cam system or gear arrangement, for example, and is configured to adjust the position of a respective blade 12 via the bearing arrangement 18. For example, the pitch actuator 16 may apply a force to the base portion 13 that twists the blade 12 about a center axis (A) with respect to the bearing arrangement 18, thereby varying the pitch of the blade 12. Each blade 12 may be adjusted among a plurality of positions. The plurality of position may include, for example, a flight position, a reversed position, and a feather position. The flight position places the blade in a low-pitch angle in order to quickly achieve high propeller speeds. The low-pitch angle may be for example, approximately 25 degrees with respect to the rotational direction of the propeller blades 12. If the angle of the blade 12 becomes too low, however, over-speed may occur which may result in engine failure.

The reverse position reverses the blade pitch angle opposite to that of the flight position. The blade pitch angle of the reverse position may be for example, approximately −15 degrees with respect to the rotational direction of the propeller blades 12. The reverse position, therefore, may slow the plane down after landing and may allow the aircraft to back-up.

The feather position increases angle of pitch by adjusting the blade 12 to be parallel to the airflow. For example, the blade pitch angle of the feather position may be for example, approximately 90 degrees with respect to the rotational direction of the propeller blades 12. Accordingly, the feather position minimizes drag from a stopped propeller following an engine failure in flight. Since the feather position reduces drag, the feather position may be used on a multi-engine aircraft to maintain altitude if the hydraulic system that controls the pitch actuator 16 fails.

The propeller system 10 further includes one or more counterweights 20 coupled to respective blade 12, and rotates along with the blade 12. Each counterweight 20 is configured to prevent the blade 12 from rotating into a low-pitch position, and instead rotates a respective blade 12 into a high-pitch position if a hydraulic failure occurs of approximately 55°. As discussed above, a low-drag position such as, for example the feather position, may allow for the continued safe operation of the aircraft despite an inability to control the pitch of the blades 12 due to a faulty hydraulic system.

Figure 2:
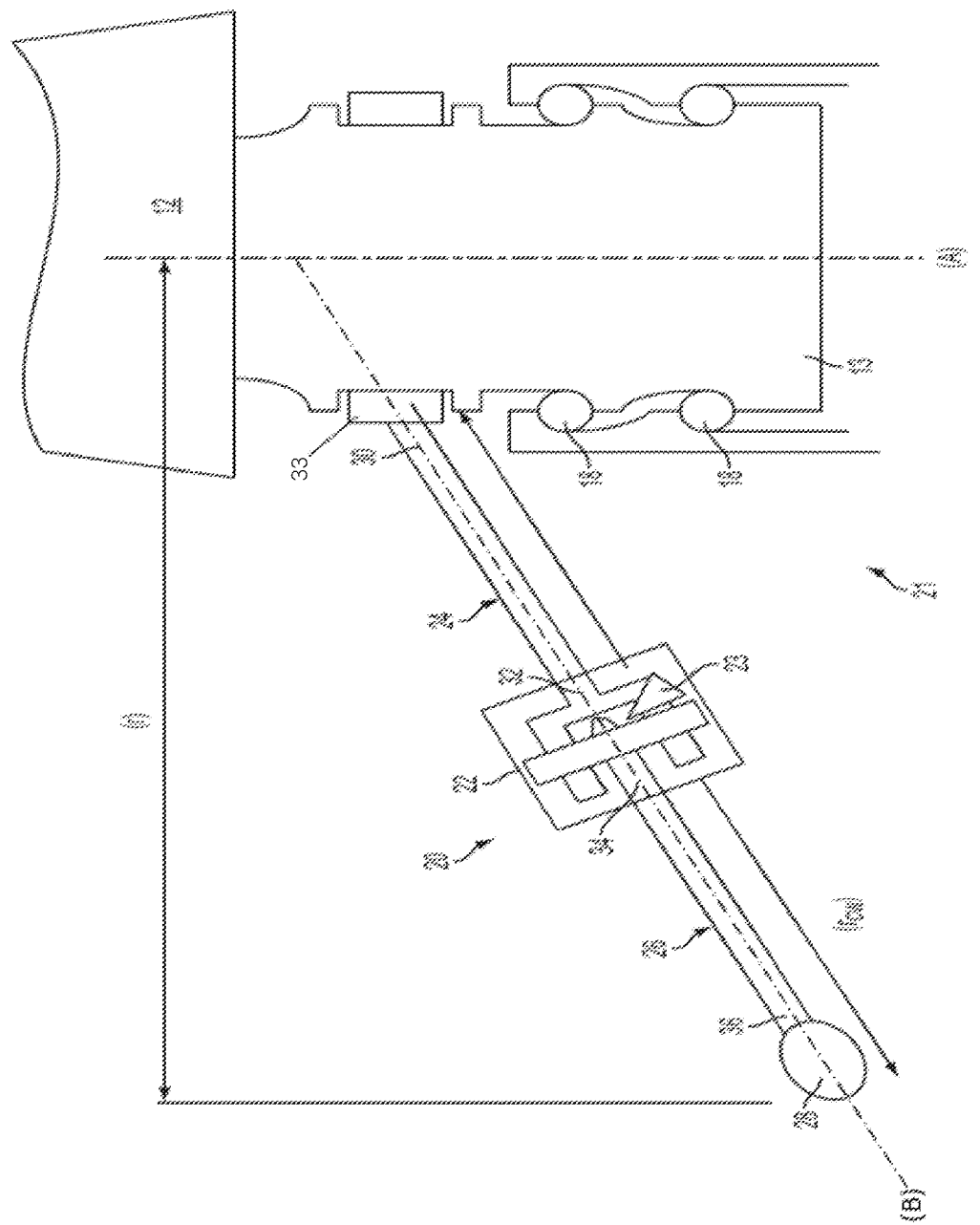
FIG. 2 is a schematic illustrating a side-view of a propeller blade assembly including a counterweight included in a propellers system according to an embodiment.

Referring to FIG. 2, a propeller blade assembly 21 including a counterweight 20 is illustrated according to at least one embodiment. The counterweight 20 includes a hinge 22, a fixed arm 24, a pivoting arm 26, and a weighted element 28. The fixed arm 24 inherently has a center axis (B). The hinge 22 may have a variety of configurations capable of allowing the pivoting arm 26 to pivot with respect to the fixed arm 24. For example, ends of the fixed arm 24 and the pivoting arm 26 may be pivotably connected to one another by a pin that provides a pivot point such that the pivoting arm 26 may rotate about the pin with respect to the fixed arm 24. Although a hinge is described, other devices capable of allowing the pivoting arm 26 to pivot with respect to the fixed arm 24 may be used.

The hinge 22 may further include a hinge-stop 23. The hinge-stop 23 provides a stop point that prevents the pivoting arm 26 from pivoting therebeyond. For example, the hinge-stop 23 may ensure that the pivoting arm 26 is fully extended (i.e., placed at the largest radius from the blade 12) and does not collapse when the blade 12 is placed in the flight position, while still allowing the pivoting arm 26 to pivot when the blade 12 is placed in the feather position.

The fixed arm 24 may be fabricated as an individual arm separately coupled to the blade 12, or may be integrally formed with the blade as an extruded element. The fixed arm 24 includes a first end 30 and a second end 32. The first end 30 is coupled to the base portion 13 of the blade 12, and the second end 32 is coupled to the hinge 22. As illustrated in FIG. 2, one or more joints 33 may be formed on the base portion 13. The axis (B) extends through fixed arm 24 arm and the joint 33. The fixed arm 24 and the joint 33 are aligned with one another along the axis (B). In at least one embodiment shown in FIG. 2, the first end 30 is coupled directly to the joint 33.

The pivoting arm 26 includes a proximal end 34 and a distal end 36. According to at least one embodiment, the length of the pivoting arm 26 is greater than a length of the fixed arm 24. The proximal end 34 is pivotably coupled to the hinge 22 such that the pivoting arm 26 pivots with respect to the fixed arm 24 and the axis (B) that extends through both the fixed arm 24 and the joint 33. The weighted element 28 is coupled to the distal end 36 of the pivoting arm 26. In at least one embodiment, the weighted element 28 may be made from various high-density materials including, but not limited to, tungsten (W). As the counterweight 20 rotates along with the blade 12, the weight of the weighted element 28 is transferred to the base portion 13 to apply a twisting moment on the blade 12. The net twisting moment on the blade 12 is in the increase-pitch direction, which forces the blade 12 into high-pitch low-drag position at an angle of, for example, 55 degrees.

As further illustrated in FIG. 2, the counterweight 20 generates an output torque ($\tau_{CW}$) that is transferred to the blade 12. The output torque ($\tau_{CW}$) induces a twisting force that forces the blade 12 into a low-drag pitch position such as, for example, an angle of 55 degrees.

Figure 3:
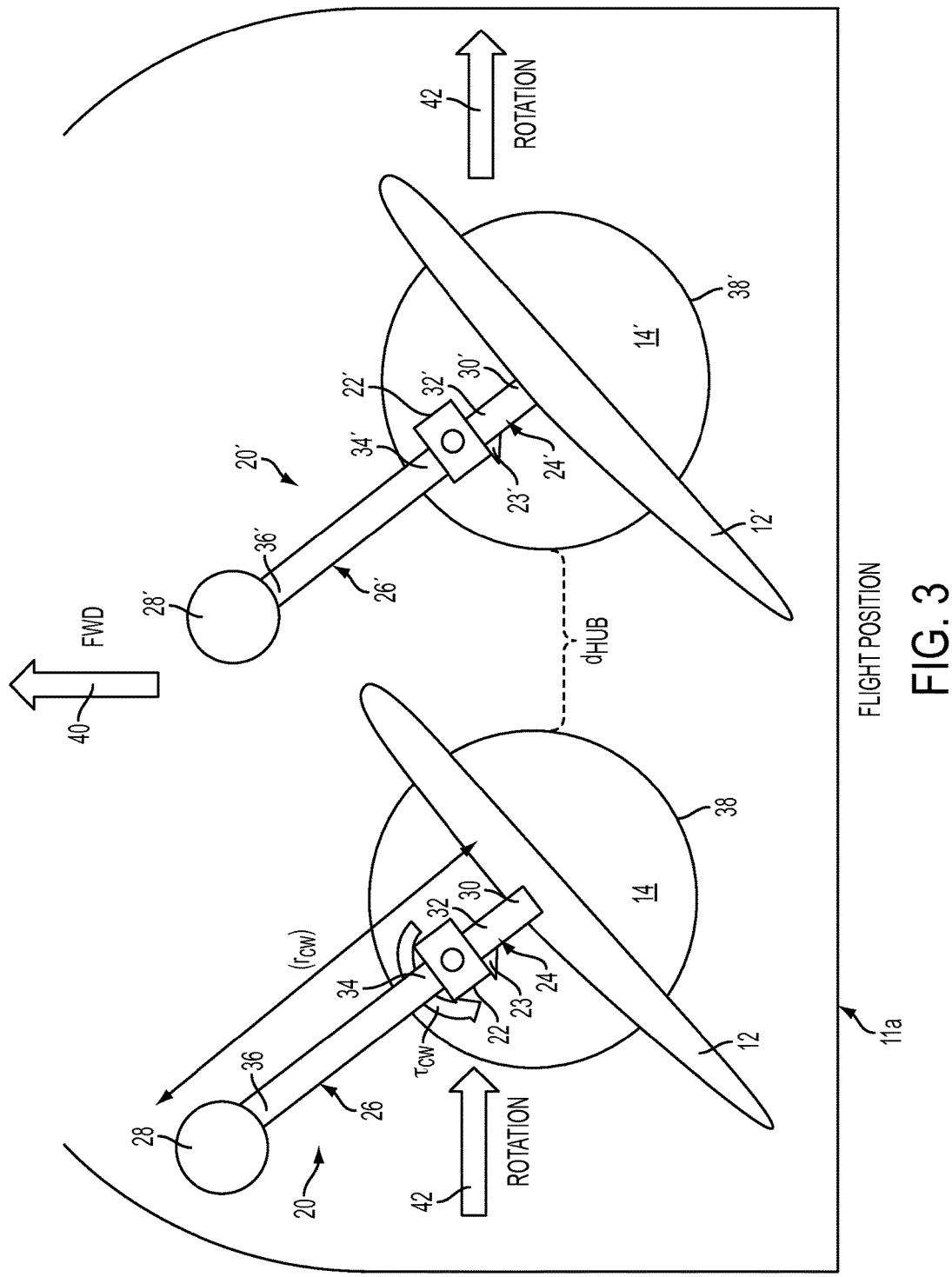
FIG. 3 is a top view of a propeller including a counterweight operating in a flight position according to an embodiment.
Figure 4:
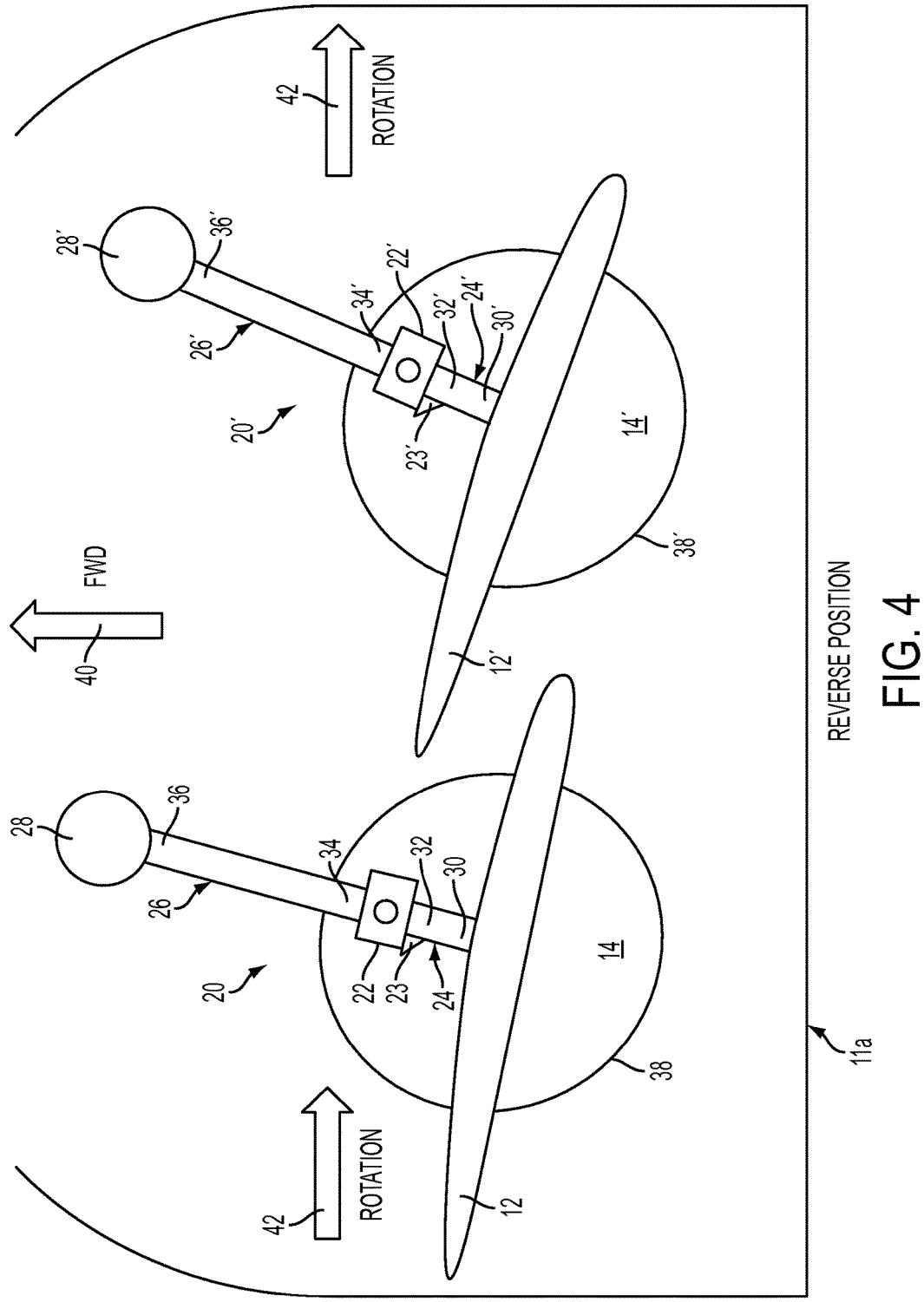
FIG. 4 is a top view of a propeller including a counterweight operating in a reversed position according to an embodiment.

FIGS. 3-5 illustrate adjacent propeller blades 12/12' including respective counterweights 20 operating in various pitch positions. Turning to FIG. 3, a first blade 12 and a second blade 12' are disposed next to one another in a respective propeller hub arm 14/14' formed in a propeller hub 11a. Each propeller hub arm 14/14' may be separated from one another by a distance ($d_{HUB}$). The distance ($d_{HUB}$) may vary based on the number of blades disposed on the propeller hub 11a. A hub envelope 38/38' may surround the opening of each propeller hub arm 14/14'. The propeller hub 11a extends in a forward direction 40 of the aircraft toward the nose portion 11b (see FIG. 1). The first and second blades 12/12' rotate about the propeller hub 11a in a rotational direction 42 perpendicular to the forward direction 40 As further illustrated in FIG. 3, the first and second blades 12/12' are shown in a low-pitch position such as, for example, a flight position. As discussed above, the flight position places the blades 12/12' in a low-pitch angle. The low-pitch angle may include, for example, approximately 25 degrees with respect to the rotational direction 42 of the blades 12/12'.

The first blade 12 includes a first counterweight 20 and the second blade 12' includes a second counterweight 20'. When rotating with the blades 12/12', the first and second counterweights 20/20' are naturally forced to pivot in a counter-clockwise direction. Accordingly, a counterclockwise output torque ($\tau_{CW}$) is transferred to the base portion 13 during rotation of the blades 12/12'. The hinge-stop 23, however, prevents the pivoting arm 26 from collapsing. For example, the hinge-stop 23 may prevent the pivoting arm 26 from rotating beyond a predetermined angle with respect to the fixed arm 24. According to one embodiment, for example, the predetermined angle is 180 degrees such that the hinge-stop maintains the counterweight at a maximum extended length. Therefore, the counterweight 20/20' may be fully extended and realizes the full radius ($r_{CW}$) (i.e., maximum extended length) of the counterweight 20/20' when the blade 12/12' is placed in the flight position, without being obstructed by the hub envelopes 38/38' and/or an adjacent blade 12/12'.

Turning to FIG. 4, the first blade 12 and the second blade 12' are illustrated in a reverse position. As discussed above, the reverse position reverses the blade pitch angle opposite to that of the flight position shown in FIG. 3. The blade pitch angle of the reverse position may be, for example, approximately −15 degrees with respect to the rotational direction 42 of the blades 12. As further shown in FIG. 3, the counterweights 20 may be fully extended to realize the full radius ($r_{CW}$), or maybe substantially extended, without being obstructed by the hub envelopes 38/38' and/or an adjacent blade 12/12'.

Turning now FIG. 5, the first and second blades 12/12' are shown in low-drag position such as, for example, a feather position. As discussed above, the feather position places the blades 12/12' in a high-pitch angle which reduces drag on the propellers 12/12'. The high-pitch angle may include, for example, approximately 55 degrees with respect to the rotational direction 42 of the blades 12/12'. As further illustrated in FIG. 5, the distance (dB) between the propeller hub arms 14/14' may cause the second counterweights 20' to contact an adjacent hub envelopes 38 and/or adjacent blade 12 when adjusting the blades 12/12' into a low-drag pitch position (e.g., the feather position).

Conventional counterweights are required to have a substantially shortened overall radius ($r_{CW}$) such that the counterweight may pass between the adjacent blades 12/12' and/or propeller hub arms 14/14'. The shorted radius ($r_{CW}$)

results in a reduced torque from the counterweight. However, the counterweight 20 according to at least one embodiment of the disclosure is configured to pivot via the hinge 22 in response to contacting an adjacent blades 12/12' and/or propeller hub arms 14/14'. As shown in FIG. 5, the pivoting arm 26 of the counterweight 20 may be pivoted ($\theta_{ARM}$) with respect to axis (B) in response to contacting the hub envelope 38/38' at a max inflight angle, for example, but does not prevent the blade 12/12' from being adjusted into a blade pitch position having a high-pitch angle such as, for example, a feather position. Therefore, the overall radius ($r_{CW}$) may be extended to increase the torque ($\tau_{CW}$) applied to the blades 12/12', while the distance (dHUB) between adjacent propeller hub arms 14/14' is reduced.

According to another embodiment, a method for operating a counterweight of a propeller blade assembly is provided. The propeller blade assembly includes a propeller blade configured to operate at a plurality of pitch angles. The method includes forming a counterweight having a fixed arm and a pivoting arm. The method further includes coupling a first end of the fixed arm to a base portion of the propeller blade. The method further includes interposing a hinge between a second end of the fixed arm and a proximate end of the pivoting arm. The pivoting arm may have a weighted element formed on a distal end thereof. The method further includes pivoting a portion of the counterweight based on a pitch angle of the propeller blade. For example, the method includes pivoting the pivoting arm with respect to the fixed arm in response to contacting a portion of the propeller blade assembly including, but not limited to, an adjacent propeller blade and a hub arm.

While various embodiments have been described in detail in connection, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that various embodiments of the invention may include only some of the described features. Accordingly, the invention is not to be seen as limited by the foregoing description, but is only limited by the scope of the appended claims.

The invention claimed is:

1. A propeller system comprising:
at least one propeller hub including a plurality of hub arms formed therein, the plurality of hub arms arranged circumferentially on the at least one propeller hub and spaced apart from one another by a hub arm distance;
a plurality of propeller blades each including a base portion rotatably disposed in a respective hub, the base portion including a joint thereon; and
at least one counterweight coupled to the base portion of a respective propeller blade, the at least one counterweight including:
a fixed arm having a first end coupled to the joint of a respective blade and a second end coupled to a hinge, the fixed arm aligned with the joint along an axis that extends through the fixed arm and the joint;
a pivoting arm including a distal end having a weighted element coupled thereto, and a proximate end pivotably coupled to the hinge such that the pivoting arm pivots with respect to the fixed arm,
wherein the hinge is configured to pivot a portion of the at least one counterweight in a direction perpendicular to the axis in response to contacting at least one of an adjacent propeller blade and an adjacent hub.

2. The propeller system of claim 1, wherein the fixed arm is integrally formed with the base portion, and a length of the pivoting arm is greater than a length of the fixed arm such that the pivot arm pivots in response to contacting at least one of an adjacent propeller blade and an envelope of an adjacent hub.

3. The propeller system of claim 2, wherein the plurality of propeller blades are configured to rotate such that a pitch of a respective propeller blade is adjusted.

4. The propeller system of claim 3, wherein the at least one counterweight is fully extended when a respective propeller blade has a first pitch angle, and the at least one counterweight is pivoted when the respective propeller blade has a second pitch angle that is greater than the first pitch angle.

5. The propeller system of claim 4, wherein the hinge includes a hinge-stop configured to prevent the pivoting arm from rotating beyond a predetermined angle with respect to the fixed arm.

6. The propeller system of claim 5, wherein the predetermined angle is 180 degrees such that the hinge-stop maintains the counterweight at a maximum extended length.

7. A propeller blade assembly comprising:
a propeller blade configured to operate at a plurality of pitch angles; and
a counterweight coupled to the propeller blade, the counterweight including a hinge configured to pivot a portion of the counterweight based on a pitch angle of the propeller blade the counterweight further comprising:
a fixed arm including a first end and a second end opposite the first end, the first end coupled to a joint on the base portion of the propeller blade and the second end pivotably coupled to the hinge, the fixed arm aligned with the joint along an axis that extends through the fixed arm and the joint;
a pivoting arm including a proximal end and a distal end opposite the proximate end,
wherein the hinge is interposed between the second end of the fixed arm and the proximate end of the pivoting arm, and is configured to pivot the pivoting arm with respect to the axis extending through the fixed arm and the joint.

8. The propeller blade assembly of claim 7, further comprising a weighted element coupled to the distal end of the pivoting arm such that the counterweight outputs a torque onto propeller blade.

9. The propeller blade assembly of claim 8, wherein the counterweight is fully extended when a respective propeller blade has a first pitch angle, and the counterweight is pivoted when the respective propeller blade has a second pitch angle that is greater than the first pitch angle.

10. The propeller blade assembly of claim 9, wherein the hinge includes a hinge-stop configured to prevent the pivoting arm from rotating beyond a predetermined angle with respect to the fixed arm.

11. The propeller blade assembly of claim 7, wherein the fixed arm is integrally formed with the base portion of the propeller blade.

* * * * *